United States Patent [19]

Vachlas et al.

[11] Patent Number: 4,916,176
[45] Date of Patent: Apr. 10, 1990

[54] COATING COMPOSITIONS

[75] Inventors: Zafirios Vachlas, Bourne End; Stephen J. Thorne, Reading, both of England

[73] Assignee: Imperical Chemical Industries PLC, Millbank, United Kingdom

[21] Appl. No.: 191,810

[22] Filed: May 6, 1988

Related U.S. Application Data

[63] Continuation of Ser. No. 20,959, Mar. 2, 1987, abandoned.

[30] Foreign Application Priority Data

Mar. 20, 1986 [GB] United Kingdom ............... 8606915

[51] Int. Cl.$^4$ ............................................. C08K 5/52
[52] U.S. Cl. .................................... 524/140; 524/408;
524/434; 524/435; 524/436; 524/441
[58] Field of Search ............... 524/140, 408, 434, 435, 524/436, 441

[56] References Cited

U.S. PATENT DOCUMENTS 2,997,454  8/1961  Leistner et al. ...................... 524/140
3,404,140  10/1968  Fukumoto et al. .................. 524/140
4,097,287  6/1978  Ito et al. ................................. 106/15

FOREIGN PATENT DOCUMENTS 0240367  4/1987  European Pat. Off. .
2163767  5/1986  United Kingdom ................ 524/140

Primary Examiner—Joseph L. Schofer
Assistant Examiner—P. D. Mulcahy
Attorney, Agent, or Firm—Cushman, Darby & Cushman

[57] ABSTRACT

An aqueous coating composition comprising a film-forming material, a metallic pigment, phosphate inhibitor being either an orthophosphoric acid or an organic acid ester of phosphoric acid containing a group of formula (I):

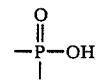

a cationic salt of one or more of the following metals: sodium, potassium, magnesium, calcium, strontium, barium, vanadium, cobalt, nickel, copper, zinc or silver; and a water containing diluent.

7 Claims, No Drawings

COATING COMPOSITIONS

This is a continuation of application Ser. No. 020,959, filed Mar. 2, 1987, which was abandoned upon the filing hereof.

This invention relates to water-containing coating compositions that contain metallic pigments.

Coating compositions containing metallic pigments, especially aluminium flake pigment, and a water-containing diluent tend to de-compose because the pigment reacts gradually with the water. As a result of the reaction, the pigmentary quality of the metallic pigment deteriorates and hydrogen is generated. The hydrogen accumulates under pressure if the composition is stored in a closed container.

The reaction can be inhibited by phosphoric acid and phosphate esters. Water-containing compositions comprising metal pigments and phosphoric acid and phosphate esters are disclosed in British Patent Application No. 8420005 and a metal powder and phosphate-containing paste for the manufacture of coating compositions is disclosed in British Patent Application No. 2053258.

We have now found that the inhibiting effect of phosphoric acid and organic phosphates on this metal pigment-water reaction can be improved by the presence of certain metal salts.

Accordingly, the present invention provides an aqueous coating composition comprising a film-forming material, a metallic pigment, phosphate inhibitor being either an orthophosphoric acid or an organic acid ester of phosphoric acid containing a group of formula (1):

a cationic salt of one or more of the following metals: sodium, potassium, magnesium, calcium, strontium, barium, vanadium, cobalt, nickel, copper, zinc or silver; and a water containing diluent.

The metallic pigment can be any such pigment capable of being used in a coating composition. Examples include pigments composed of aluminium and aluminium alloys e.g. aluminium-copper alloy, aluminium-zinc alloy, aluminium-nickel alloy and aluminium-magnesium alloy.

Preferably the pigment is an aluminium flake pigment.

Preferably the flake has a thickness in the range 0.01 to 5 microns and has a length and width in the range 1 to 50 microns.

The water-containing diluent can contain only a minor proportion of water, e.g. 5% of water. Usually it consists of 50% by weight of water. Preferably, it contains at least 75% by weight of water. In particular, it contains 88% by weight of water.

Examples of phosphoric acid esters that can be used in this invention include mono- and di-$C_4$-$C_{18}$ alkyl esters in particular mono- and dibutylphosphate, mono and dipentyl phosphate, mono- and dihexylphosphate, mono- and diheptylphosphate, mono- and dioctylphosphate, mono- and dinonylphosphate, mono- and dihexadecylphosphate and mono- and dioctadecylphosphate; and aryl and aralkyl esters containing from 6 to 10 carbon atoms in the aromatic group, for example mono- and diphenylphosphate and mono- and dibenzylphosphate.

Other esters are as described in British Patent Application 8420005. These consist of the reaction products of compounds containing a group of formula (1):

reactant (i), with one or more compounds containing in the molecule at least one epoxide group (reactant (ii) provided that either reactant (i) or reactant (ii) contains at least one aromatic or alicyclic group.

Examples of compounds containing the group of formula (1) (reactant (i)) are orthophosphoric acid and the mono esters listed above.

Examples of aromatic compounds containing at least one epoxide group (reactant (ii)) are glycidyl esters of monohydric phenols or substituted phenols, in particular phenyl or substituted phenyl glycidyl ether, and alkyl derivatives thereof, the glycidyl ethers of aromatic alcohols in particular benzyl or substituted benzyl glycidyl ether, the glycidyl esters of aromatic monocarboxylic acids in particular glycidyl benzoate, and the glycidyl polyethers of polyhydric phenols or hydrogenated phenols.

An example of an alicyclic epoxy compound is cyclohexeneoxide.

Simple phosphate esters of this class are of general formula:

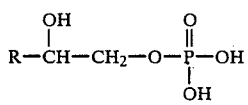

Where R is a phenoxy or substituted phenoxy group, a benzyloxy or substituted benzyloxy group, or a benzoyl or substituted benzoyl group.

More complex esters of this class are of formula:

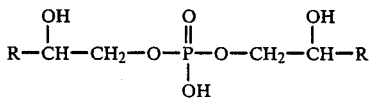

Where R is as previously defined.

Other more complex compounds of this class are based on diphenolol propane units. These compounds have the general forumula:

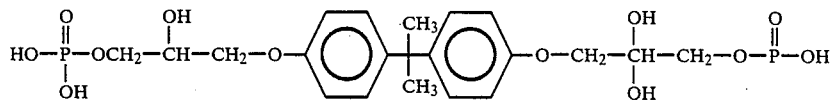

This structure can be represented by the formula:

P—E—D—E—P where P represents:

E represents:

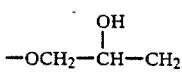

and D represents:

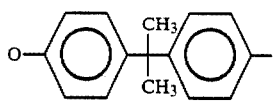

More complex molecules of this type contain more EDE repeat units. The diphosphate have the structure P—(ED)$_n$ E—P where it is such that the molecular weight of the compound is from 500–10,000.

One particular compound of this general type is available under the trade mark EPIKOTE 828 and has an idealised molecular weight 536.

The terminal phosphate groups can be reacted with an epoxide of formula:

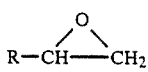

where R is previously defined to form a compound of formula:

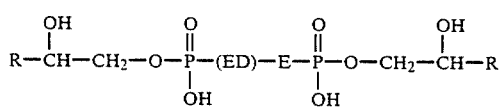

In this class n is such that the molecular weight of the compound is from 500–10,000.

These compounds, which are described in British Patent Application 8420005, can be prepared by reacting reactants (i) and (ii) together optionally in the presence of a catalyst capable of catalysing the opening of the epoxide ring.

Examples of such catalysts include organic bases in particular triethylamine.

The reaction can be carried out in an inert polar diluent or solvent for example dioxan or tetraydrofuran, and at elevated temperature, for example, up to the reflux temperature of the diluent or solvent.

Phosphate esters that can be used in the compositions of this invention include polymeric acid phosphate esters, which contain more than one phosphoric acid residue in the molecule, for example those obtained by reacting a polymer containing a number of hydroxyl groups with phoshorous pentoxide or a polymer containing a number of epoxide groups with orthophosphoric acid.

The polymers containing hydroxyl groups can be obtained from styrene and allyl alcohol. The ratio of styrene to allyl alcohol is in the ratio of 1:1 to 4:1. Such polymers have an idealised structure:

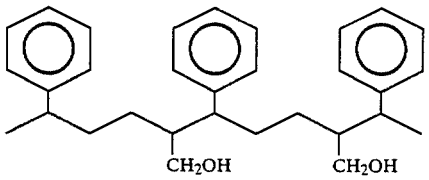

With phosphorous pentoxide, these polymers form a mixture of primary and secondary phosphates. These secondary phosphates can cause cross-linking. To limit such cross-linking so as to minimize gel formation, an amount of a simple hydroxy compound is present during the reaction between the polymer and the phosphorous pentoxide. The amount of phosphorous pentoxide is theoretically a stoichiometric amount, but in practice a slight excess of the compound is usually required. The precise amount is determined in each case by trial and error.

The ester obtained in this way has the idealised structure:

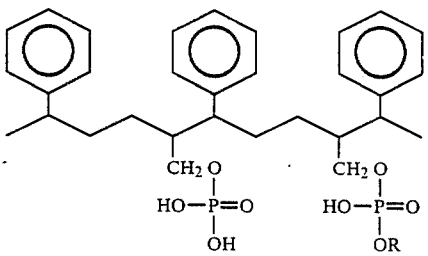

The compounds of this type have a molecular weight in the range of 500 to 10,000.

Polymers containing epoxide groups have a carbon back bone and the following idealised formula:

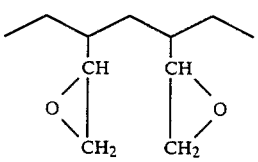

The phosphate derivatives are formed by reaction with orthophosphoric acid again in the presence of a simple hydroxy compound to minimize gel formation through secondary phosphate esters. The phosphate derivatives have the idealised formula:

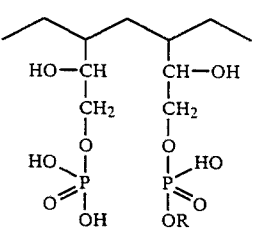

The amount of the phosphate inhibitor used in the compositions of the present invention is preferably one which, on the basis of its acid value as determined by titration with potassium hydroxide to a phenolphthalein end point, is equivalent to from 0.2% to 5%, more preferably from 0.5% to 2%, of orthophosphoric acid, based upn the weight of metallic pigment present. Depending on its molecular weight, this may correspond to an actual weight percentage of the agent of from 1% to as much as 200%, based on the weight of metallic pigment.

Where the water content of the coating composition is sufficiently high, the metal salt can be a water-soluble inorganic salt, for example, a sulphate, a nitrate or a chloride.

Where the organic constituents of the composition are a high proportion of the composition, preferably the metal salt is an organic salt or soap.

Examples of such salts include the octanoates, naphthenates, oleates and salts of synthetic organic acids that can be used as metal "driers" in paints curing by an autoxidation mechanism.

The amount of metal salt present in the compositionis in practice not less than 0.005% based on the total weight of the composition and calculated as metal. The optimum amount in any particular instance may readily be determined by simple experiment.

Other constituents of the compositions of the invention are those which are conventional in the art, that is to say, the film-forming material and any diluents other than water may be any of those which are well known for use in either wholly water-borne or partly aqueous coating compositions. The same applies to other optional constituents such as crosslinking agents, thickeners, fillers, plasticisers and UV absorbers. The compositions are likewise produced by a conventional blending or mixing of the various constituents, modified if necessary for the incorporation of metal salt.

The phosphate and the metal salt can, in most cases, be mixed in with any or all of the constituents, but preferably it is added after the metallic pigment has been at least partially dispersed or de-agglomerated.

The way in which the metal salt is introduced may vary according to the type of salt which is being employed. If it is an organic salt or soap, it is preferable to dilute it first with part of the organic solvents or other liquid constituents before blending it with the remaining constituents. If the metal is in the form of a water-soluble inorganic salt, it is likewise preferably diluted with an aqueous component of the composition before it is blended with the other constituents. If desired, the metal salt may alternatively be blended first with the phosphate inhibiting agent, either with or without the application of heat, and thus be introduced at the same stage as that agent.

The improved stability of the compositions of the present invention can be demonstrated by the decrease in "gassing" (hydrogen production) observed with these compositions as compared with aqueous coating compositions containing no phosphate inhibitor or no metal salt.

The following Examples, in which parts and percentages are by weight, illustrate the invention.

EXAMPLE 1

A. Preparation of organic acid phosphate inhibitor

The inhibitor, of the type described in our British Patent Application No. 8420005, was prepared as follows:

Orthophosphoric acid (88% aqueous solution: 24.63 parts) and triethylamine (0.16 part) were placed in a stirred vessel. A previously blended mixture of epoxy resin ("Epikote" 828*: 42.16 parts) and phenylglycidyl ether (33.18 parts) was then added at a steady rate over a period of about 1 hour. During the addition, the temperature rose to 110°–120° C. When the addition was complete, the temperature was held at 110°–120° C. for a further 2 hours to complete the reaction. The resulting brown, viscous liquid had an acid value (determined by titration with alcoholic KOH to a phenolphthalein end point) of 140–150 mg KOH/g, and an epoxide value of less than 3. This product was found on cooling to ambient temperature to form a hard, solid, resinous material, so, in order to facilitate subsequent handling, it was diluted and neutralised whilst still warm in the following way. To the warm product (17.00 parts) was added 2-butoxyethanol (41.72 parts), followed by triethylamine (3.46 parts) and demineralised water (36.31 parts). When the resulting solution was cool, its pH was adjusted to 7.6 by the addition of further triethylamine (1.51 parts).

*"Epikote" is a Registered Trade Mark.

B. Preparation of water-born "metallic" paint: general procedure

Aluminium flake pigment paste (65% metal in mineral spirit: "Alcoa" 7474*: 25 parts) was stirred into 2-butoxyethanol (40.58 parts), followed by a melamine-formaldehyde resin of 80% non-volatile content ("Cymel" 325*: 22.5 parts) and polypropylene glycol, average mol. wt. 440 (12.0 parts), and stirring was continued until the aluminium was adequately dispersed.

The dispersion was then diluted with stirring with an aqueous dispersion of an acrylic resin (395.3 parts); the acrylic resin had an acid value of 25 mg KOH/g non-vol. The dispersion has a non-volatile content of 18.0% and was neutralised with triethylamine to pH 7.2. There was then added a 3% aqueous solution of a polyacrylic acid thickener also having pH 7.2 (169.0 parts), followed by further 2-butoxyethanol, demineralised water and triethylamine so that the paint composition thus obtained had a total non-volatile content of 16.1%, a 2-butoxyethanol content of 13.2% and a pH of 7.6.

*"Alcoa" and "Cymel" are Registered Trade Marks.

C. Preparation of paints incorporating phosphorus-containing inhibitors and metal salts The general procedure described in (B) above was modified in various ways in order to incorporate different inhibitors and different metal salts as set out in the accompanying Table I. Where the inhibitor used was orthophosphoric acid, this was added as 1% aqueous solution, neutralised to pH 7.2 with triethylamine, to the aqueous dispersion of the acrylic resin before the latter was blended with the aluminium pigment, melamine-formaldehyde resin and polypropylene glycol. The amount taken was that shown in Table I. Where the inhibitor used was the organic acid phosphate, the preparation of which is described in (A) above, the requisite amount of the 16.1% solids solution of that product of pH 7.6 was blended into the initial mixture of aluminium pigment, melamine-formaldehyde resin and polypropylene glycol, prior to the addition thereto of the aqueous dispersion of acrylic resin and other ingredients. Where the metal salt used was a water-soluble sulphate, the requisite quantity of this, as shown in Table I, was dissolved in demineralised water at a concentration of 1.0% with respect to the metal, and this solution was blended with the 3% aqueous solution of the polyacrylic acid thickener before addition of the latter to the previously blended other constituents of the paint.

Where the metal salt used was a salt or soap of an organic acid, viz. naphthenic acid, oleic acid or a synthetic organic acid, the salt or soap was introduced following the blending of the aluminium pigment with the 2-butoxyethanol, prior to the addition of the melamine-formaldehyde resin. A number of control paint compositions were also prepared, variously omitting the inhibiting agent, or the metal salt, or both, as shown in Table I.

D. Testing for inhibition of gassing reaction

A sample of 160 g of each of the paint compositions as shown in Table I and described in (C) above was placed in a 150 ml glass flask fitted with a stopper and a manometer tube dipping below the level of the sample in the flask. After sealing, each flask was immersed in a water bath at 40° C. and the rise of the level of paint in each manometer tube was recorded at the time intervals shown in Table I. By previous calibration, these changes in level were converted to volume of gas evolved by a unit quantity of paint. The results obtained were as shown, from which it will be seen that the inhibiting effect of a phosphorus-containing agent in conjunction with a metal salt was markedly greater than that of the agent alone.

E. Application of paint compositions and humidity resistance testing of the coatings

(i) Preparation of acrylic polymer for clearcoat composition

To a reactor fitted with stirrer, thermometer and reflux condenser was charged:

| | |
|---|---|
| xylene | 22.260 parts |
| aromatic hydrocarbon b.p. 190–210° C. | 10.000 parts |
| The mixture was heated to reflux temperature (142–146° C.) and the following premixed ingredients were added at a steady rate over 3 hours | |
| styrene | 21.49 parts |
| ethyl acrylate | 4.51 parts |
| 2-ethylhexyl acrylate | 13.75 parts |
| hydroxyethyl acrylate | 10.05 parts |
| acrylic acid | 0.49 parts |
| cumene hydroperoxide | 1.41 parts |

The reactants were held at reflux temperature for a further 2 hours, after which there was added:

| | |
|---|---|
| isobutyl alcohol | 12.72 parts |
| xylene | 3.32 parts |

A clear solution of polymer was thus obtained, having a solids content of 50%.

(ii) Preparation of solvent-borne clearcoat composition

The following ingredients were blended together:

| | |
|---|---|
| polymer solution from stage (i) | 53.3 parts |
| butylated melamine-formaldehyde resin, 67% solution in butanol | 26.5 parts |
| dipentene | 5.0 parts |
| flow-promoting polymer, 10% solution in xylene | 0.1 part |

| —continued | |
|---|---|
| isobutyl alcohol | 2.0 parts |
| xylene | 13.1 parts |

A clear solution of 44.4% solids was obtained. It had a viscosity of 40 secs. (B.S.B4 cup at 25° C.).

(iii) Application of basecoat and clearcoat to a substrate

Metal panels were prepared with primer and surfacer. There were then applied to the panels, as basecoats, two coats each of certain of the metallic pigment-containing paint compositions described in part (c) above, as identified in Table II below. The compositions were applied by spray at a flow-rate of 400 ml/min, without further thinning, at a temperature of 22° C. and a relative humidity of 39%. A two-minute flash-off period was allowed between the coats.

After application of the second basecoat, the panel was blown with air at 25° C. and two coats of clearcoat composition as described in stage (ii) were applied, the clearcoat composition having been thinned beforehand with xylene to a viscosity of 45 secs. (B.S.B4 cup at 25° C.). The two coats were applied wet-on-wet with a two-minute flash-off period between the coats. After a final three-minute flash-off, the panel was stoved at 125°–130° C. for 30 minutes.

(iv) Humidity Testing

The panels prepared as in (iii) were tested for humidity resistance in the 'Cleveland Cabinet' (manufactured by the Q-Panel Company, 15610, Industrial Parkway, Cleveland, Ohio, U.S.A.) In this apparatus, a waterbath is maintained at a constant temperature of 140° F. (60° C.). The atmosphere above the water is enclosed by a cabinet, the roof of which is formed by the panels under test. The painted surface of each panel is exposed to the interior of the cabinet, while the back of the panel is exposed to the atmosphere of the room in which the cabinet is housed, that atmosphere being maintained at a temperature of 70°–75° F. (21.1°–23.9° C.). The panels are thus exposed to continued condensation of water on the painted surfaces under test.

In all respects other than the temperature of operation the test as just described corresponds to ASTM D-2247.

The assessment of humidity resistance was made by measuring the 20° gloss of the painted surfaces of the panels initially and after 24 hours and 48 hours exposure respectively in the humidity cabinet. The results are shown in Table II.

F. Modified preparation of water-borne "metallic" paint

A series of paints was prepared following the procedure and quantities described in (B) and (C) above, except that the phosphorus-containing inhibitor was in each case first of all blended with the metal salt, and the blend was then added to the initial mixture of aluminium pigment, melamine-formaldehyde resin and polypropylene glycol. All these ingredients were stirred together for one hour prior to the addition thereto of the aqueous dispersion of acrylic resin and other ingredients. The inhibitors and metal salts used are shown in Table III, together with the amounts taken.

In all of these paint compositions, the aluminium flake pigment paste again consisted of 65% metal in mineral spirit but was the brand "Silberline 5000 AR" instead of that identified in (B). ("Silberline" is a Registered Trade Mark).

The paints thus obtained were tested for inhibition of the gassing reaction as described in (D) above. The results are shown in Table III.

TABLE I

| Paint Composition No. | Polyvalent metal salt | Metal concentration, % on total paint | P-containing inhibitor | Inhibitor concentration % on Al metal* | Gas evolution, mls/100 g of paint at 40° C. | |
|---|---|---|---|---|---|---|
| | | | | | 72 hours | 1000 hours |
| 1 | NONE | — | NONE | — | >11.0 | Al completely dissolved |
| 2 | $Cu^{++}$ sulphate | 0.02 | NONE | — | >11.0 | Al completely dissolved |
| 3 | $Cu^{++}$ sulphate | 0.02 | Orthophosphoric acid | 1.0 | 0 | 4.8 |
| 4 | NONE | — | Orthophosphoric acid | 1.0 | 2.7 | 10.4 |
| 5 | NONE | — | Orthophosphoric acid | 1.5 | — | 3.6 |
| 6 | $Cu^{++}$ sulphate | 0.02 | Organic acid phosphate (A) | 13.4 (1.7) | 0 | 0.6 |
| 7 | NONE | — | Organic acid phosphate (A) | 13.4 (1.7) | 1.0 | 8.0 |
| 8 | $Cu^{++}$ naphthenate | 0.02 | Organic acid phosphate (A) | 13.4 (1.7) | 0 | 0 |
| 9 | $Cu^{++}$ naphthenate | 0.01 | Organic acid phosphate (A) | 13.4 (1.7) | 0 | 0.4 |
| 10 | $Cu^{++}$ naphthenate | 0.02 | Organic acid phosphate (A) | 5.0 (0.63) | 1.6 | 4.5 |
| 11 | $Ba^{++}$ salt of synthetic organic acid | 0.02 | Organic acid phosphate (A) | 13.4 (1.7) | 0 | 4.2 |
| 12 | $Zn^{++}$ octoate | 0.02 | Organic acid phosphate (A) | 13.4 (1.7) | 0 | 0.6 |
| 13 | $Co^{++}$ salt of synthetic organic acid | 0.02 | Organic acid phosphate (A) | 13.4 (1.7) | 0 | 3.4 |
| 14 | NONE | — | Organic acid phosphate (A) | 31.5 (4.0) | 2.0 | 6.2 |

*figures in parantheses are the equivalent amounts of orthophosphoric acid.

TABLE II

| Paint Composition No. | Polyvalent metal salt | Metal concentration, % on total paint | P-containing inhibitor | Inhibitor concentration, % on Al metal | 20° gloss | | |
|---|---|---|---|---|---|---|---|
| | | | | | Initial | After 24 hrs | After 48 hrs |
| 1 | NONE | — | NONE | — | 92 | 93 | 90 |
| 5 | $Cu^{++}$ sulphate | 0.02 | Organic acid phosphate (A) | 13.4 | 94 | 91 | 89 |
| 6 | NONE | — | Organic acid phosphate (A) | 13.4 | 93 | 91 | 90 |
| 7 | $Cu^{++}$ naphthenate. | 0.02 | Organic acid phosphate (A) | 13.4 | 98 | 95 | 88 |
| 13 | NONE | — | Organic acid phosphate (A) | 31.5 | 97 | 48 | 13* |

*accompanied by formation of dense blisters.

TABLE III

| Paint Composition No. | Polyvalent metal salt | Metal concentration, % on total paint | P-containing inhibitor | Inhibitor concentration, % on Al metal | Gas evolution, mls/100 g of paint at 40° C. | |
|---|---|---|---|---|---|---|
| | | | | | 72 hrs | 1000 hrs |
| 15 | $Cu^{++}$ naphthenate | 0.02 | Organic acid phosphate (A) | 13.4 (1.7) | 0 | 0 |
| 16 | $Cu^{++}$ naphthenate | 0.01 | Organic acid phosphate (A) | 13.4 (1.7) | 0.65 | 3.3 |
| 17 | NONE | — | Organic acid phosphate (A) | 13.4 (1.7) | 1.1 | 5.5 |
| 18 | $Zn^{++}$ octoate | 0.02 | Organic acid phosphate (A) | 13.4 (1.7) | 0 | 0.2 |
| 19 | $Zn^{++}$ octoate | 0.01 | Organic acid | 13.4 (1.7) | 0 | 0.6 |

TABLE III-continued

| Paint Composition No. | Polyvalent metal salt | Metal concentration, % on total paint | P-containing inhibitor | Inhibitor concentration, % on Al metal | Gas evolution, mls/100 g of paint at 40° C. 72 hrs | 1000 hrs |
|---|---|---|---|---|---|---|
| | | | phosphate (A) | | | |

*figures in parentheses are the equivalent amounts of orthophosphoric acid.

We claim:

1. A coating composition comprising a film-forming material, a metallic pigment, a phosphate inhibitor being either an orthophosphoric acid or an organic ester of phosphoric acid containing a group of formula (I):

a water containing diluent and a salt which is soluble in said water containing diluent, and which is a salt of a metal selected from the group consisting of sodium, potassium, magnesium, calcium, strontium, barium, vanadium, cobalt, nickel, copper, zinc and silver, there being sufficient water in the diluent to dissolve said salt.

2. A composition according to claim 1 where the metal pigment is aluminium flake.

3. A composition according to claim 1 where the phosphate inhibitor is orthophosphoric acid.

4. A composition according to claim 1 and orthophosphate ester/diphenolol polymer of molecular weight 500–10,000.

5. A composition according to claim 1 where the metal salt is copper, zinc or cobalt salt.

6. A composition according to claim 1 where the salt is copper or zinc naphthenate.

7. A composition as set forth in claim 2 in which the metal in said salt is selected from the group consisting of copper, barium, zinc and cobalt.

* * * * *